(12) United States Patent
Yoshioka et al.

(10) Patent No.: US 10,147,022 B2
(45) Date of Patent: Dec. 4, 2018

(54) DETECTION METHOD AND SYSTEM

(71) Applicant: FUJITSU LIMITED, Kawasaki-shi, Kanagawa (JP)

(72) Inventors: Takahiro Yoshioka, Tachikawa (JP); Satoshi Nakashima, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/141,000

(22) Filed: Apr. 28, 2016

(65) Prior Publication Data
US 2016/0379093 A1    Dec. 29, 2016

(30) Foreign Application Priority Data
Jun. 23, 2015  (JP) ................. 2015-126081

(51) Int. Cl.
| | | |
|---|---|---|
| *G06K 9/62* | (2006.01) | |
| *G06K 9/00* | (2006.01) | |
| *G06K 9/46* | (2006.01) | |
| *H04N 5/33* | (2006.01) | |

(52) U.S. Cl.
CPC ......... *G06K 9/6256* (2013.01); *G06K 9/0061* (2013.01); *G06K 9/00255* (2013.01); *G06K 9/00281* (2013.01); *G06K 9/00604* (2013.01); *G06K 9/00617* (2013.01); *G06K 9/4661* (2013.01); *H04N 5/33* (2013.01)

(58) Field of Classification Search
CPC ........ G06T 2207/10048; G06K 9/0061; G06K 9/6256; G06K 9/4661; H04N 13/0484
See application file for complete search history.

(56) References Cited

U.S. PATENT DOCUMENTS

| | | | | |
|---|---|---|---|---|
| 5,008,946 A | * | 4/1991 | Ando ................. | B60H 1/00757 180/167 |
| 2003/0118217 A1 | * | 6/2003 | Kondo ............... | G06K 9/00604 382/117 |

(Continued)

FOREIGN PATENT DOCUMENTS

| | | |
|---|---|---|
| EP | 1 324 259 A1 | 7/2003 |
| EP | 2 639 743 A2 | 9/2013 |

(Continued)

OTHER PUBLICATIONS

Takehiko Ohno et al. "An Eye Tracking System Based on Eye Ball Model Toward Realization of Gaze Controlled Input Device", Information Processing Society of Japan, 2001, 8 pages ( with English Abstract).

(Continued)

*Primary Examiner* — Iman K Kholdebarin
*Assistant Examiner* — Mai Tran
(74) *Attorney, Agent, or Firm* — Oblon, McClelland, Maier & Neustadt, L.L.P.

(57) ABSTRACT

A detection method executed by a computer, the detection method includes detecting a plurality of pupil candidates from a face image region in an image of a subject based on specific shape information, and identifying at least one pupil candidate as a pupil from among the plurality of pupil candidates based on brightness information related to an image region outside of the face image region and learning information indicating a relationship between the brightness information and a size of the pupil.

16 Claims, 16 Drawing Sheets

(56) References Cited

U.S. PATENT DOCUMENTS

| | | | |
|---|---|---|---|
| 2004/0095556 A1* | 5/2004 | Mihashi | A61B 3/022 351/238 |
| 2004/0170304 A1* | 9/2004 | Haven | A61B 3/113 382/115 |
| 2005/0280777 A1* | 12/2005 | Dai | A61B 3/0091 351/246 |
| 2006/0238707 A1* | 10/2006 | Elvesjo | A61B 3/113 351/209 |
| 2007/0279590 A1* | 12/2007 | Ebisawa | A61B 3/113 351/208 |
| 2009/0032679 A1* | 2/2009 | Holladay | A61F 2/1618 250/201.2 |
| 2012/0050516 A1* | 3/2012 | Tsukizawa | G06K 9/00604 348/78 |
| 2013/0057573 A1* | 3/2013 | Chakravarthula | G06F 3/005 345/619 |
| 2013/0063582 A1* | 3/2013 | Choi | G06K 9/00617 348/78 |
| 2013/0243251 A1* | 9/2013 | Nakashima | G06K 9/0061 382/103 |
| 2014/0210964 A1* | 7/2014 | Muijs | H04N 13/373 348/54 |
| 2014/0333897 A1* | 11/2014 | Becken | A61B 3/0025 351/211 |
| 2014/0340637 A1* | 11/2014 | Trumm | A61B 3/11 351/206 |
| 2015/0254508 A1* | 9/2015 | Kimura | G06K 9/0061 382/117 |
| 2015/0287206 A1 | 10/2015 | Ebisawa | |
| 2015/0288923 A1* | 10/2015 | Kim | H04N 5/23296 348/14.05 |
| 2016/0171300 A1* | 6/2016 | Takemoto | G06K 9/00617 382/117 |
| 2016/0262611 A1* | 9/2016 | Rotenstreich | A61B 3/14 |
| 2016/0266643 A1* | 9/2016 | Martensson | G09G 3/20 |
| 2016/0274656 A1* | 9/2016 | Hosabettu | G09G 5/003 |
| 2016/0307038 A1* | 10/2016 | Skogo | G06K 9/00604 |
| 2016/0379093 A1* | 12/2016 | Yoshioka | G06K 9/6256 382/159 |
| 2017/0041586 A1* | 2/2017 | Pisani | A61B 3/0025 |

FOREIGN PATENT DOCUMENTS

| | | | |
|---|---|---|---|
| EP | 2 857 939 A1 | 4/2015 | |
| JP | 2002-56394 | 2/2002 | |
| JP | 2008246004 A * | 10/2008 | G06T 1/00 |
| JP | 2013-215549 | 10/2013 | |
| JP | 2017010337 A * | 1/2017 | G06K 9/6256 |
| WO | WO 2011/105004 A1 | 9/2011 | |

OTHER PUBLICATIONS

Tomoharu Nakahara et al. "Human Detection Method for Autonomous Mobile Robots", Matsushita Electric Works Technical Report, vol. 53, No. 2, 2005, 5 pages ( with English Abstract).

Extended Search Report dated Nov. 7, 2016 in European Patent Application No. 16167332.2.

Shuyan Zhao, et al., "Robust Eye Detection under Active Infrared Illumination", The 18th International Conference on Pattern Recognition (ICPT'06), IEEE, Computer Society, vol. 1, XP55206001, 2006, 4 pages.

* cited by examiner

FIG. 4

| ID | X COORDINATE | Y COORDINATE | RADIUS | PROFILE LIKELIHOOD |
|---|---|---|---|---|
| 1 | 100 | 150 | 10 | 0.84 |
| 2 | 80 | 120 | 4 | 0.92 |
| 3 | 85 | 100 | 6 | 0.93 |
| ⋮ | ⋮ | ⋮ | ⋮ | ⋮ |

FIG. 6

| ID | RADIUS | DIFFERENCE | SIZE LIKELIHOOD | PROFILE LIKELIHOOD | PUPIL LIKELIHOOD |
|----|--------|------------|-----------------|--------------------|------------------|
| 1 | 10 | 7 | 0.65 | 0.84 | 0.54 |
| 2 | 4 | 1 | 0.95 | 0.92 | 0.87 |
| 3 | 6 | 3 | 0.85 | 0.93 | 0.79 |
| ... | ... | ... | ... | ... | ... |

# DETECTION METHOD AND SYSTEM

CROSS-REFERENCE TO RELATED APPLICATION

This application is based upon and claims the benefit of priority of the prior Japanese Patent Application No. 2015-126081, filed on Jun. 23, 2015, the entire contents of which are incorporated herein by reference.

FIELD

Techniques to be disclosed in embodiments herein are related to techniques for detecting the line of sight of a subject person from an image.

BACKGROUND

There is a technique for detecting the line of sight of a subject person based on a cornea reflection technique by using a near-infrared light source and a near-infrared camera (for example, see Takehiko Ohno et al., "An Eye Tracking System Based on Eye Ball Model—Toward Realization of Gaze Controlled Input Device", Information Processing Society of Japan 2001-HI-93, 2001, pp. 47-54 (which will be referred to as "Non Patent Literature 1" hereinafter)). The cornea reflection technique involves generating reflection on the cornea by using a near-infrared light source and determining the center of the reflection and the center of a pupil in accordance with image processing. Then, in the cornea reflection technique, the line of sight of the subject person is detected based on the positional relationship between the center of the reflection and the center of the pupil. In the image processing for detecting the pupil, an image processing device detects an eye region and also detects pupil candidates from the eye region by using template information.

There is also a technique for calculating the brightness of the eye region and identifying a pupil candidate having a radius closest to the radius corresponding to the current brightness from among the previously-detected pupil candidates based on brightness pupil information prepared in advance (for example, see Japanese Laid-open Patent Publication No. 2013-215549 (which will be referred to as "Patent Literature 1" hereinafter)). Specifically, the image processing device identifies a real pupil from among the pupil candidates by using the brightness of the eye region in an image to be processed.

SUMMARY

According to an aspect of the invention, a detection method executed by a computer, the detection method includes detecting a plurality of pupil candidates from a face image region in an image of a subject based on specific shape information, and identifying at least one pupil candidate as a pupil from among the plurality of pupil candidates based on brightness information related to an image region outside of the face image region and learning information indicating a relationship between the brightness information and a size of the pupil.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates a data configuration example of a pupil-candidate storage unit;
FIG. 6 is a diagram for explaining a pupil likelihood.

DESCRIPTION OF EMBODIMENTS

In the related-art techniques described above, the size of the pupil is estimated in correspondence with the brightness of the eye region based on an assumption that the pupil size has changed in accordance with the brightness of the eye region. In this case, there is an assumption that the intensity of visible light that affects expansion or contraction of the pupil is proportional to the intensity of near-infrared light. Visible light derives from natural light or illumination light. Furthermore, near-infrared light derives from near-infrared light included in natural light or illumination light and near-infrared light deriving from the near-infrared light source.

However, for example, if the subject person whose line of sight is to be detected is wearing glasses, the following problems occur. The near-infrared light radiated from the near-infrared light source may be strongly reflected at the lens surface of the glasses, causing the entire eye region to appear brighter. In this case, assuming that the brightness of the environment (i.e., the intensity of visible light) that affects contraction of the pupil is low, it may be estimated that the pupil has contracted owing to the effect of reflection deriving from near-infrared light generated in the eye region in the image. As a result, although the subject person's pupil may have actually expanded, a pupil candidate having a small radius may be identified as a pupil owing to the brightness of the eye region.

The techniques to be disclosed in the embodiments have been made in view of the circumstances described above, and an object is to reduce false detection of a pupil caused by the effect of reflection of light radiated from a light source.

Embodiments of a line of sight detection technique and a pupil detection technique will be described in detail below with reference to the drawings. It is to be noted that these embodiments are not limited thereto.

First Embodiment

Figure 1:
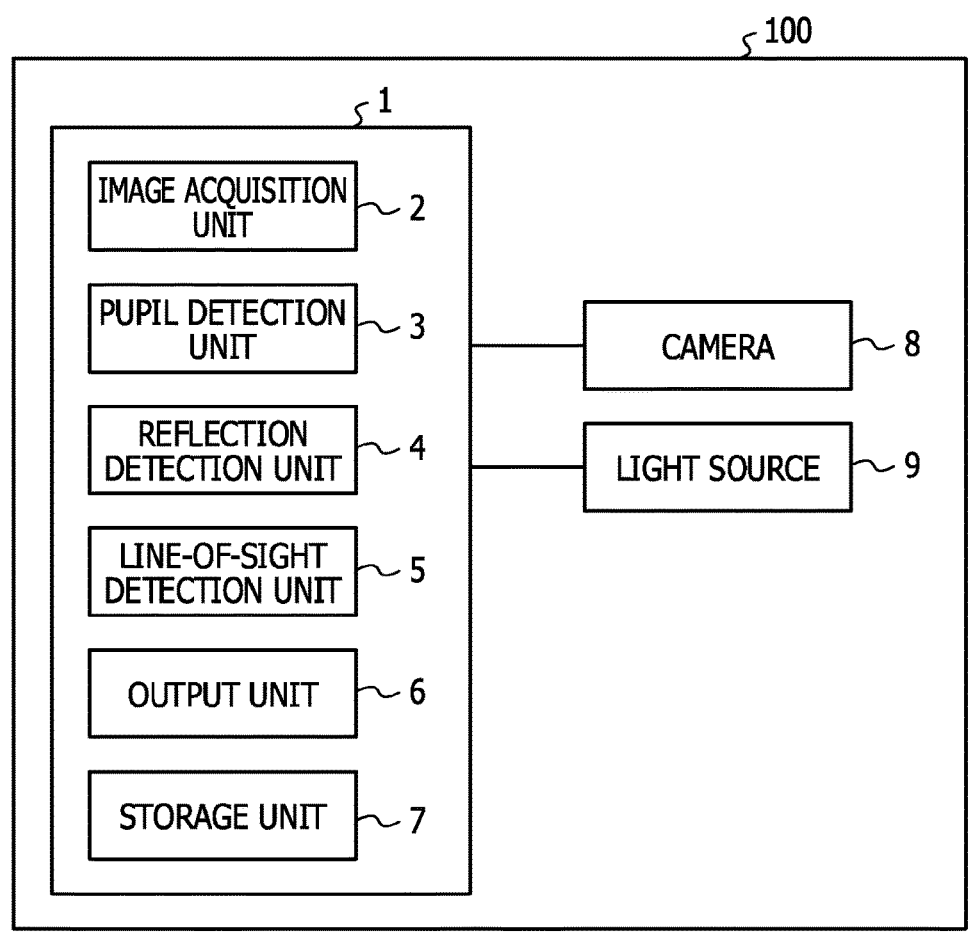
FIG. 1 illustrates the configuration of a line of sight detection system according to an embodiment.

FIG. 1 illustrates the configuration of a line of sight detection system according to this embodiment. As illustrated in FIG. 1, a line of sight detection system 100 includes a line of sight detection device 1, a camera 8, and a light source 9. The camera 8 is an example of an image capturing device having sensitivity to light with a predetermined wavelength. The light source 9 radiates light with a predetermined wavelength.

The camera 8 and the light source 9 are connected to the line of sight detection device 1. However, instead of being wired-connected to the line of sight detection device 1, the camera 8 and the light source 9 may communicate with the line of sight detection device 1 by wireless communication. Therefore, when a line of sight detection process commences, the camera 8 captures images at fixed time intervals under the control of the line of sight detection device 1 and transmits image data related to the captured images to the line of sight detection device 1. Moreover, under the control of the line of sight detection device 1, the power of the light source 9 is also turned on.

In this embodiment, near-infrared light not visible to a subject person whose line of sight is to be detected is used as the light with the predetermined wavelength. Thus, the camera 8 is a near-infrared light camera, and the light source 9 is a light source that radiates near-infrared light. Moreover, an image to be captured by the camera 8 is a near-infrared image. A near-infrared image is an image of an object captured with brightness according to the intensity of reflection of near-infrared light radiated from the light source 9 and the intensity of reflection of near-infrared light radiated from another light source (e.g., natural light or light from a fluorescent lamp). In this embodiment, a line of sight is detected by detecting cornea reflection of light radiated from the light source 9 and the pupils of the subject person by using the near-infrared image.

The line of sight detection device 1 detects the line of sight of the subject person. In this embodiment, the line of sight detection device 1 executes a line of sight detection process on the near-infrared image acquired from the camera 8 so as to detect the line of sight of the subject person. A processing result obtained by the line of sight detection device 1 is used in, for example, marketing analysis. In detail, in a case where the camera 8 and the light source 9 are installed on a shelf or a merchandise plate in a retail store, the line of sight detection device 1 detects the line of sight of a photographed subject person. Then, in marketing analysis, it is estimated which one of the merchandise items the customer is interested in from this line of sight. For example, a merchandise item that attracts the interest of many customers can be ascertained from an output (line of sight detection result) from the line of sight detection device 1.

As illustrated in FIG. 1, the line of sight detection device 1 has an image acquisition unit 2, a pupil detection unit 3, a reflection detection unit 4, a line of sight detection unit 5, an output unit 6, and a storage unit 7. The line of sight detection device 1 is a computer.

The image acquisition unit 2 acquires, from the camera 8, image information related to the image captured by the camera 8. In this embodiment, the image acquisition unit 2 acquires image information corresponding to the near-infrared image of a photographed face of the subject person. The image information contains brightness information indicating the intensity of near-infrared light in each pixel. In a case where the camera 8 and the line of sight detection device 1 communicate with each other by wireless communication, the image acquisition unit 2 functions as a communication unit.

The pupil detection unit 3 detects the pupils of the subject person from an image by processing the image input from the image acquisition unit 2. A detailed description will be provided later. The pupil detection unit 3 can also function as a pupil detection device, which is an independent computer.

The reflection detection unit 4 detects cornea reflection by processing the image input from the image acquisition unit 2. The reflection detection unit 4 detects cornea reflection in accordance with, for example, the method described in Non Patent Literature 1.

The line of sight detection unit 5 detects the line of sight of the subject person based on the detection result of the pupil detection unit 3 and the detection result of the reflection detection unit 4. The line of sight detection unit 5 detects the line of sight of the subject person based on the relationship between the pupil position and the cornea reflection position in accordance with, for example, the method described in Non Patent Literature 1.

The output unit 6 outputs the detection result obtained by the line of sight detection unit 5 to other devices. Examples of the other devices include a computer that performs marketing analysis and an input interface that uses the direction of the line of sight.

The storage unit 7 is a storage unit that stores various types of information to be used for the line of sight detection process.

Figure 2:
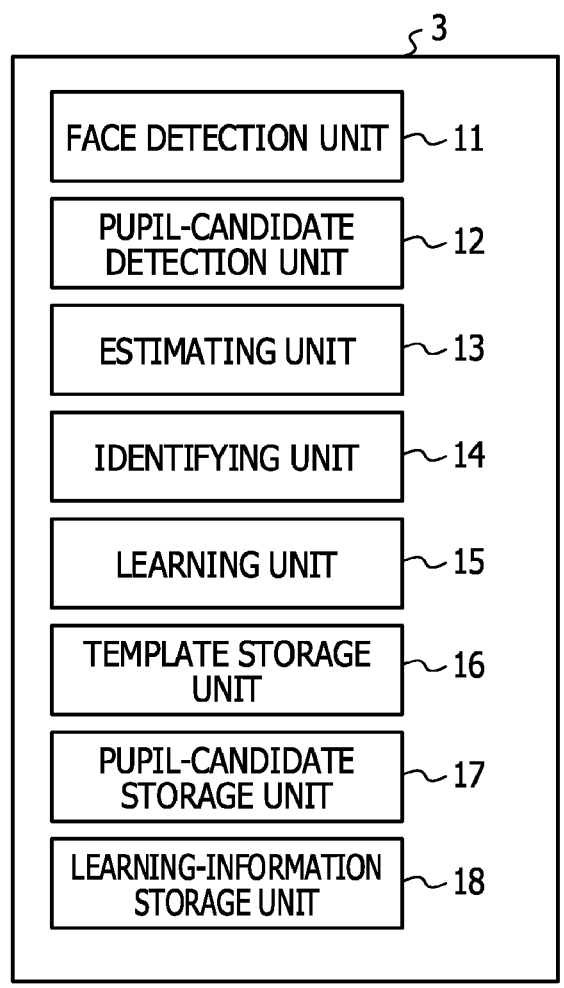
FIG. 2 illustrates a functional configuration example of a pupil detection unit.

Next, a detailed functional configuration of the pupil detection unit 3 will be described. FIG. 2 illustrates a functional configuration example of the pupil detection unit 3. FIG. 2 also corresponds to a functional configuration example of a pupil detection device.

The pupil detection unit 3 has a face detection unit 11, a pupil-candidate detection unit 12, an estimating unit 13, an identifying unit 14, a learning unit 15, a template storage unit 16, a pupil-candidate storage unit 17, and a learning-information storage unit 18. The template storage unit 16, the pupil-candidate storage unit 17, and the learning-information storage unit 18 may be realized as the storage unit 7 in FIG. 1.

The face detection unit 11 detects a face region corresponding to the face of the subject person from the image input from the image acquisition unit 2. In this case, a method in the related art is used as a method for detecting the face region. For example, the face region is detected in accordance with the method disclosed by Tomoharu Nakahara et. al., "Human Detection Method for Autonomous Mobile Robots", Matsushita Electric Works Technical Report, Vol. 53, No. 2 or a face detection technique using a template related to facial features.

The pupil-candidate detection unit 12 detects pupil candidates from the image input from the image acquisition unit 2. In detail, the pupil-candidate detection unit 12 further detects an eye region from the face region detected by the face detection unit 11. For the detection of the eye region, for example, the method disclosed in Patent Literature 1 is used.

The pupil-candidate detection unit 12 executes template matching on the eye region so as to detect pupil candidates. For example, the method disclosed in Patent Literature 1 is used. To describe this briefly, the pupil-candidate detection unit 12 extracts a shape similar to template information stored in the template storage unit 16 from the eye region in the near-infrared image. The template information is an example of shape information related to a specific shape.

The template storage unit 16 will now be described. The template storage unit 16 stores template information related to a pupil shape. Preferably, the template storage unit 16 stores circular template information having various radii so that pupils of various sizes can be detected.

Figure 3:
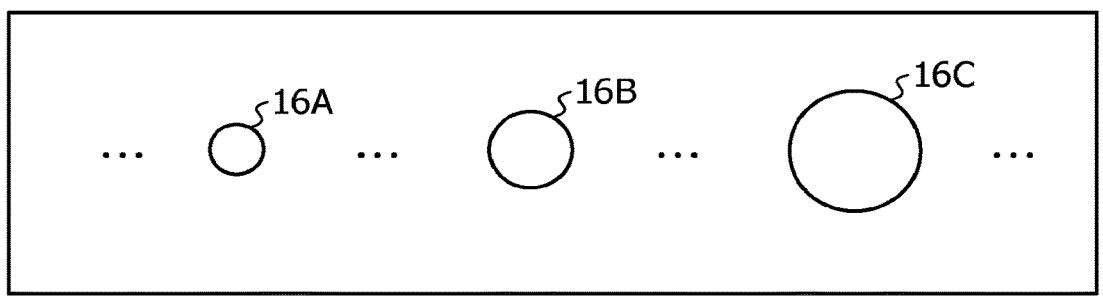
FIG. 3 illustrates an example of template information stored in a template storage unit.

FIG. 3 illustrates examples of the template information stored in the template storage unit 16. As illustrated in FIG. 3, pieces 16A, 16B, and 16C of template information having various radii are stored in advance.

The pupil-candidate detection unit 12 scans a template over the eye region and detects a region that partially matches the profile of the template as a pupil candidate. After completing the scanning of the template of a certain size, the pupil-candidate detection unit 12 changes the size of the template and repeats the scanning process so as to detect circular regions having different sizes as pupil candidates.

If pupil candidates are detected, the pupil-candidate detection unit 12 adds an ID to each pupil candidate, associates the ID, positional information (X coordinate and Y coordinate) of the pupil candidate, and the radius thereof with one another, and stores them into the pupil-candidate storage unit 17. In this case, the ID is information for uniquely identifying the detected pupil candidate. The positional information (X coordinate and Y coordinate) of the pupil candidate is assumed as the central coordinates in a case where the pupil candidate is complemented to a circular shape by the template. The radius of the pupil candidate is the radius of a circle in the case where the pupil candidate is complemented to the circular shape by the template.

Furthermore, the pupil-candidate detection unit 12 calculates a profile likelihood for each pupil candidate and stores the profile likelihood into the pupil-candidate storage unit 17. The profile likelihood expresses how certain the pupil candidate is a pupil in view of the profile of the pupil candidate. Specifically, the degree of matching between the profile of the pupil candidate and the contour of the template becomes higher as the profile likelihood becomes greater, and there is a high possibility that the pupil candidate is a pupil in view of the shape thereof. The profile likelihood is calculated in accordance with, for example, the method disclosed in Patent Literature 1.

For example, the pupil-candidate detection unit 12 calculates the profile likelihood based on the degree of matching between the profile of the detected pupil candidate and the contour of the template. Alternatively, the pupil-candidate detection unit 12 may only store pupil candidates with profile likelihood greater than or equal to a threshold value into the pupil-candidate storage unit 17.

Next, the pupil-candidate storage unit 17 will be described. The pupil-candidate storage unit 17 stores pupil-candidate information related to each pupil candidate. FIG. 4 illustrates a data configuration example of the pupil-candidate storage unit 17. The pupil-candidate storage unit 17 stores an ID, an X coordinate, a Y coordinate, a radius, and a profile likelihood in association with one another. The pupil-candidate information contains an ID, an X coordinate, a Y coordinate, a radius, and a profile likelihood.

Next, the estimating unit 13 estimates a pupil size based on brightness information of a target region. The target region covers all of or part of a region, in an image, excluding the face region detected by the face detection unit 11.

For example, the estimating unit 13 generates representative brightness information of the target region from brightness information of each pixel included in the target region. The representative brightness information is, for example, an average value or median value of the brightness of the pixels. Then, the estimating unit 13 determines a pupil size corresponding to the representative brightness information of the target region based on learning information stored in the learning-information storage unit 18. The learning information indicates the relationship between the brightness information of the target region and the pupil size (radius).

Figure 5:
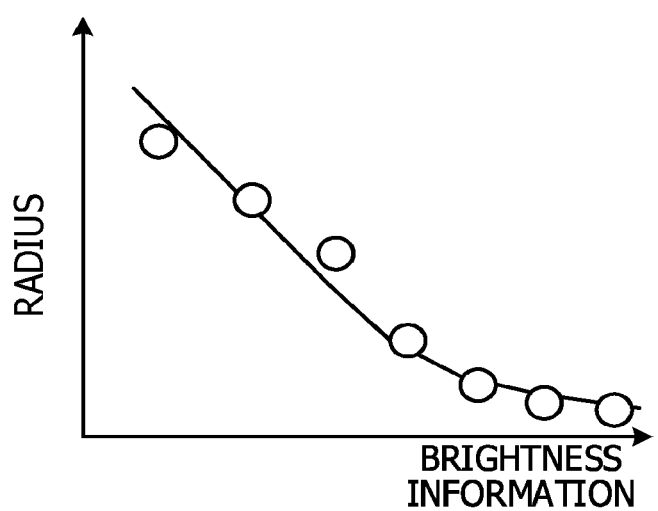
FIG. 5 illustrates an example of learning information stored in a learning-information storage unit.

The learning-information storage unit 18 will now be described. The learning information is generated by the learning unit 15, which will be described later, and is stored in the learning-information storage unit 18. FIG. 5 illustrates an example of the learning information stored in the learning-information storage unit 18.

As illustrated in FIG. 5, the learning information is, for example, a function indicating the relationship established between the brightness information of the target region and the pupil radius (pixels). In the example in FIG. 5, the abscissa axis indicates the brightness information of the target region, whereas the ordinate axis indicates the pupil radius. As illustrated in FIG. 5, the pupil radius becomes smaller as the brightness information becomes greater (i.e., as the environment becomes brighter).

The identifying unit 14 detects a pupil from among the pupil candidates detected by the pupil-candidate detection unit 12 based on the pupil size (radius) estimated by the estimating unit 13. For example, the identifying unit 14 calculates a pupil likelihood based on the estimated pupil size and the profile likelihood and detects a pupil based on the pupil likelihood. FIG. 6 is a diagram for explaining the pupil likelihood.

As illustrated in FIG. 6, for each pupil candidate (ID), the identifying unit 14 calculates a difference between the pupil size (radius) estimated by the estimating unit 13 and the size (radius) of the pupil candidate. Moreover, based on the difference, the identifying unit 14 calculates a size likelihood in accordance with, for example, Formula 1 below. The size likelihood corresponds to a value obtained by normalizing the difference between the estimated pupil size and the size of the pupil candidate. Specifically, the size likelihood becomes a larger value as the estimated pupil size and the size of the pupil candidate become closer to each other. In Formula 1, A denotes a value set for normalization.

$$\text{SIZE LIKELIHOOD} = 1 - \frac{\text{DIFFERENCE}}{A} \quad \text{(Formula 1)}$$

Then, the identifying unit 14 calculates a pupil likelihood of each pupil candidate from the profile likelihood calculated by the pupil-candidate detection unit 12 and the size likelihood in accordance with Formula 2 below. Specifically, the pupil likelihood is a value obtained by taking into account a possibility in which the pupil candidate is a pupil in view of the shape thereof (profile likelihood) and a possibility in which the pupil candidate is a pupil under the brightness of the current environment in view of the size thereof (size likelihood).

$$\text{Pupil Likelihood} = \text{Profile Likelihood} \times \text{Size Likelihood} \quad \text{(Formula 2)}$$

Subsequently, the identifying unit 14 identifies a pupil candidate having the maximum pupil likelihood, which is also greater than a predetermined threshold value, from among the plurality of pupil candidates.

In the example in FIG. 6, for example, it is assumed that the pupil radius estimated by the estimating unit 13 is "3 (pixels)". In this case, the identifying unit 14 calculates a difference of "7" for the pupil candidate with the ID of "1". Based on Formula 1, the identifying unit 14 calculates a size likelihood of "0.65". In this case, it is assumed that A is set to be 20. Then, based on a pre-calculated profile likelihood of "0.84" and the size likelihood of "0.65", the identifying unit 14 calculates a pupil likelihood of "0.54".

As a result of the identifying unit 14 calculating a pupil likelihood for each pupil candidate in this manner, the pupil candidate with the ID of "2" is identified as a pupil in the example in FIG. 6. The pupil candidate with the ID of "2" has a pupil radius of "4", which is the closest to the pupil radius of "3" estimated by the estimating unit 13.

The identifying unit 14 may alternatively detect a pupil candidate having a radius closest to the estimated pupil size as a pupil without taking into account the profile likelihood. Specifically, the size likelihood may be used as the pupil likelihood. However, if there are a plurality of pupil candidates having the same pupil likelihood (size likelihood), for example, the identifying unit 14 identifies a pupil based on a detection result obtained from each of left and right eye regions. In detail, a rule indicating that, for example, the pupils of the left and right eyes have substantially the same positional relationship with cornea reflection and have substantially the same size is designated in advance. In accordance with that rule, the identifying unit 14 identifies a pupil from among each of the left and right pupil candidates.

The learning unit 15 generates learning information indicating the relationship between the brightness information of the target region and the pupil size (radius). In detail, prior to actual line of sight detection or pupil detection, the learning unit 15 first acquires a plurality of near-infrared images as learning images. Each learning image is an image captured in an environment similar to the environment in which line of sight detection is to be actually performed. Moreover, the learning images are a plurality of images captured at various brightness levels in the same environment.

For example, the learning images are images captured by the camera 8, which is installed on a certain shelf in a retail store, at various times and weather conditions that provide different intensities of natural light entering the retail store. In such a case where the environment in which line of sight detection is to be actually performed is already known, it is preferable that learning information be generated for each of the known environments. Each learning image is an image captured in a state where near-infrared light is radiated from the light source 9.

The learning unit 15 then detects a face region from a learning image in accordance with a process similar to that performed by the face detection unit 11. Furthermore, the learning unit 15 detects an eye region from the learning image in accordance with a process similar to that performed by the face detection unit 11. Then, the learning unit 15 detects a pupil candidate from the eye region in the learning image in accordance with a process similar to that performed by the pupil-candidate detection unit 12. Furthermore, if there are a plurality of pupil candidates, the learning unit 15 determines a pupil by making the subject person (manager) select the proper pupil. If a pupil is not properly detected from the learning image, the learning image is not used for a learning process.

The learning unit 15 may determine a pupil automatically in accordance with the method disclosed in Non Patent Literature 1. To describe this briefly, the learning unit 15 smooths the image and performs segmentation by joining regions in which the brightness difference between two adjacent pixels is smaller than or equal to a fixed value. Moreover, the learning unit 15 determines a pupil region from among the segmented regions based on the profile shape and the brightness. In detail, the learning unit 15 identifies a region with a substantially circular shape and a low brightness level as a pupil region. If a pupil is not properly detected from the learning image, the learning image is not used for the learning process.

By applying the pupil detection process described in Non Patent Literature 1 to the learning process according to this embodiment, a pupil can be automatically detected even in a state where learning information is not generated. However, a pupil can be detected more easily with the pupil detection process (after learning) disclosed in this embodiment. Therefore, the pupil detection process (after learning) disclosed in this embodiment can reduce the calculation amount and shorten the processing time, as compared with the pupil detection process described in Non Patent Literature 1.

When the learning unit 15 determines a pupil in the above-described manner, the learning unit 15 calculates the size (radius) of the determined pupil. Then, the learning unit 15 sets a target region in accordance with a process similar to that performed by the estimating unit 13 and generates representative brightness information of the target region. Subsequently, the learning unit 15 generates learning information in which the representative brightness information and the pupil size information are associated with each other.

The above process is performed for each acquired learning image so that a plurality of pieces of learning information are accumulated. Based on the accumulated pieces of information, the learning unit 15 generates learning information. For example, the pieces of learning information are accumulated until the difference between the minimum value and the maximum value of the representative brightness information becomes 100 or more, so that highly-reliable learning information can be generated. Then, the learning unit 15 stores the learning information into the learning-information storage unit 18.

Figure 7:
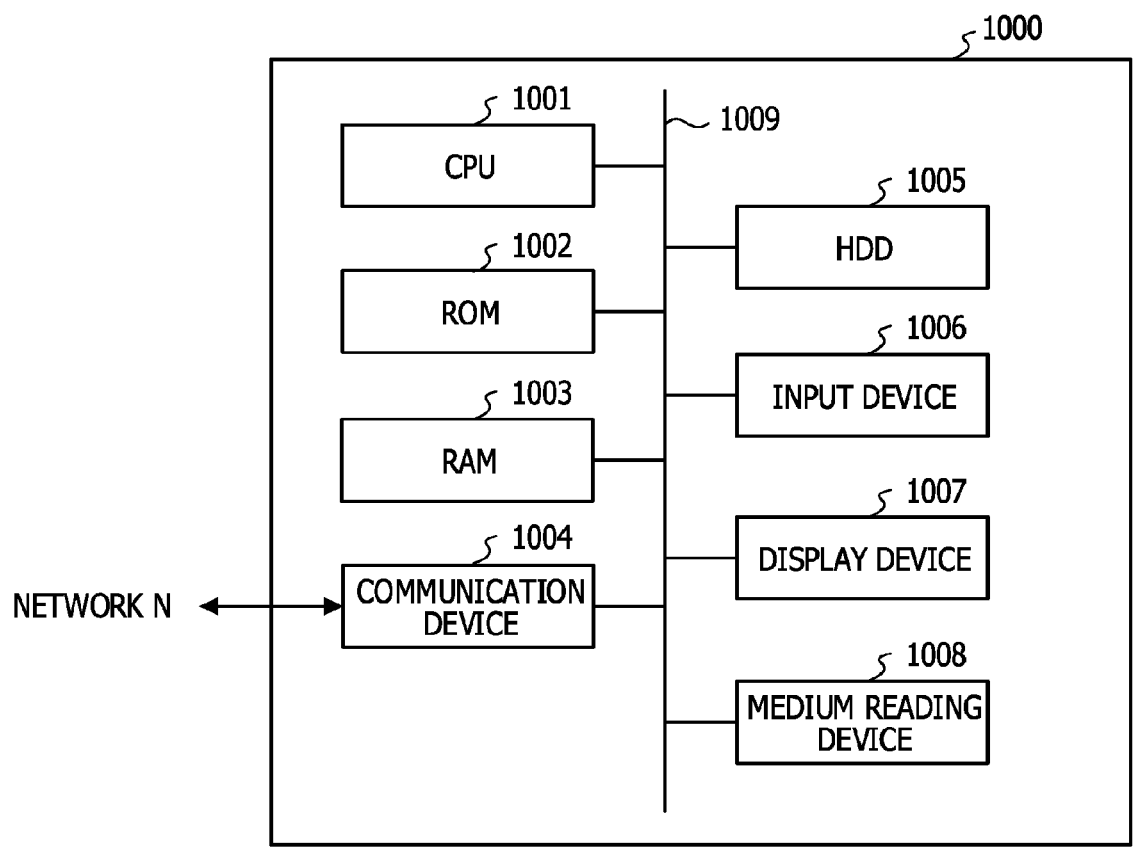
FIG. 7 illustrates a hardware configuration of a line of sight detection device.

Next, a hardware configuration example of the line of sight detection device 1 will be described. FIG. 7 illustrates the hardware configuration of the line of sight detection device 1. A computer 1000 executes the line of sight detection process according to this embodiment so as to function as the line of sight detection device 1. The computer 1000 may also sometimes function as a pupil detection device (pupil detection unit 3) by executing the pupil detection process according to this embodiment.

The computer 1000 has a central processing unit (CPU) 1001, a read-only memory (ROM) 1002, a random access memory (RAM) 1003, a communication device 1004, a hard disk drive (HDD) 1005, an input device 1006, a display device 1007, and a medium reading device 1008. These components are interconnected via a bus 1009. Under the control of the CPU 1001, the components are capable of exchanging data with one another.

A program related to the pupil detection process and a program related to the series of line of sight detection process including the pupil detection process are stored in a storage medium readable by the computer 1000. Examples of the storage medium readable by the computer 1000 include a magnetic storage device, an optical disk, a magneto-optical storage medium, and a semiconductor memory. Examples of the magnetic storage device include a HDD, a flexible disk (FD), and a magnetic tape (MT).

Examples of the optical disk include a digital versatile disc (DVD), a DVD-RAM, a compact disc read-only memory (CD-ROM), and a compact disc recordable/rewritable (CD-R/RW). The magneto-optical storage medium is, for example, a magneto-optical disk (MO). If the program having written therein the process according to each embodiment is to be distributed, for example, it is conceivable to sell transportable storage media, such as DVDs and CD-ROMs, having the program stored therein.

The medium reading device 1008 of the computer 1000 that executes the program according to this embodiment reads the program from a storage medium having stored therein the program. The CPU 1001 loads the read program to the HDD 1005, the ROM 1002, or the RAM 1003. The CPU 1001 is a central processing device that controls the operation of the entire line of sight detection device 1.

The CPU 1001 then reads the program having written therein the process related to this embodiment from the HDD 1005 and executes the program so that the CPU 1001 functions as the pupil detection unit 3, the reflection detection unit 4, and the line of sight detection unit 5 in the line of sight detection device 1. The CPU 1001 may also sometimes function as the face detection unit 11, the pupil-candidate detection unit 12, the estimating unit 13, the identifying unit 14, and the learning unit 15 in the pupil detection device (pupil detection unit 3). As described above, the program may be loaded into the ROM 1002 or the RAM 1003 accessible by the CPU 1001.

The communication device 1004 functions as the image acquisition unit 2 and the output unit 6 under the control of the CPU 1001.

Under the control of the CPU 1001, the HDD 1005 stores various types of information and functions as the storage unit 7. The HDD 1005 may also sometimes function as the template storage unit 16, the pupil-candidate storage unit 17, and the learning-information storage unit 18 in the pupil detection device (pupil detection unit 3). Similar to the program, the various types of information may be loaded into the ROM 1002 or the RAM 1003 accessible by the CPU 1001. Furthermore, various types of information to be temporarily generated and stored in the course of the process are loaded into, for example, the RAM 1003.

The input device 1006 receives various kinds of inputs. For example, the input device 1006 receives an input when the subject person selects a proper pupil from among pupil candidates in the learning process. The input device 1006 is, for example, a keyboard and/or a mouse.

The display device 1007 displays various types of information. The display device 1007 is, for example, a display. For example, the display device 1007 displays a line of sight detection result and a pupil-candidate detection result for making the subject person select a proper pupil from among pupil candidates in the learning process.

Accordingly, the functional units illustrated in FIGS. 1 and 2 are realized by hardware (computer) that includes processor and memory units.

The line of sight detection device 1 may sometimes be realized in a cloud environment. Specifically, the image captured by the camera 8 is transmitted to a server in the cloud environment, and the server or a plurality of servers including the relevant server may execute the pupil detection process according to this embodiment or the series of line of sight detection process including the relevant pupil detection process.

Figure 8:
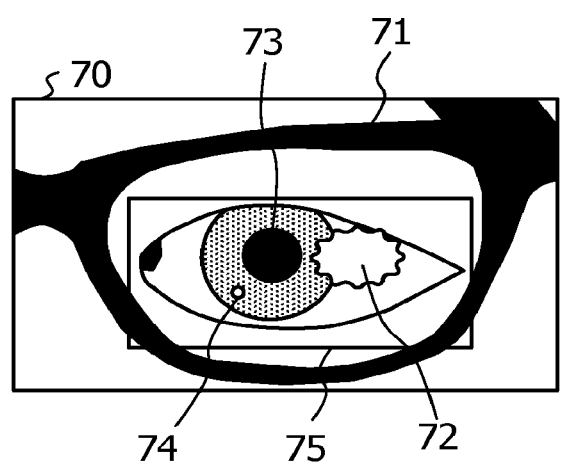
FIG. 8 is an enlarged view of a portion of a near-infrared image captured in a state where a subject person is wearing glasses.

Next, the advantages of performing pupil detection by using a target region will be described. FIG. 8 is an enlarged view of a portion of a near-infrared image captured in a state where the subject person is wearing glasses. As illustrated in FIG. 8, a portion 70 of the near-infrared image includes a part of the face of the subject person wearing glasses 71. Because near-infrared light is radiated from the light source 9, reflection 72 of the near-infrared light is occurring on the lens surface of the glasses 71. Cornea reflection utilized in line of sight detection corresponds to reflection 74 occurring on the surface of the subject person's eyeball. A pupil to be detected corresponds to a region 73.

If reflection of light is occurring on the surface of an object with low flatness (i.e., high spherical properties), such as on an eyeball, the percentage of reflection light reaching the camera 8 and included in the overall reflection light is smaller than the percentage of reflection light reaching the camera 8 and included in the overall reflection light on the surface of a high flatness object. Therefore, the reflection occurring on the eyeball surface is observed as a small spot, like the reflection 74, on the near-infrared image. In contrast, the reflection occurring on the surface of a high flatness object, like the lens of the glasses 71, is observed in a wide range, like the reflection 72, on the near-infrared image.

In view of the above circumstances, for example, if the pupil size (radius) is estimated from brightness information of an eye region 75, as in the image processing device in the related art, it may be difficult to properly estimate the pupil size owing to the effect of the reflection 72.

In view of the conditions in which line of sight detection is actually performed, the subject person may often be located in front of the camera 8 with the background, such as a wall, located behind the subject person. The present inventor has discovered that an image region that is less likely to be affected by the reflection of light from the light source 9 exists in the background of the subject person.

The present inventor has conceived of a method for solving the aforementioned problems by using brightness information of a specific image region in an image. Specifically, the method allows for pupil detection with respect to an indefinite number of subject persons including a subject person wearing glasses. This image region corresponds to the target region described above.

Next, the image region (target region) that is less likely to be affected by the reflection of light from the light source 9 will be described. Generally, the light intensity when light radiated from a light source (e.g., the light source 9 or the sun) reaches an object is inversely proportional to the square of the distance from the light source to the object.

Figure 9:
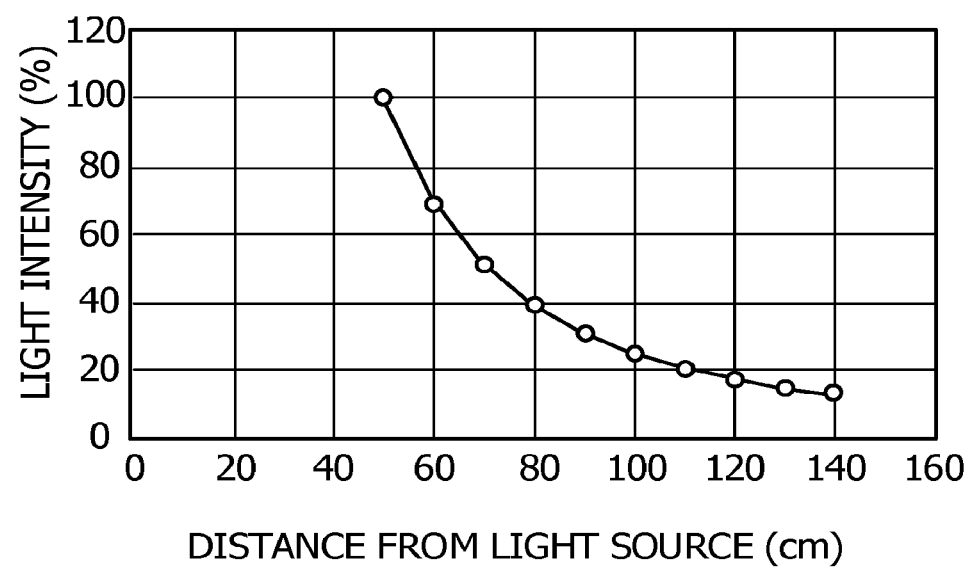
FIG. 9 is a diagram illustrating attenuation of light.

FIG. 9 is a diagram illustrating attenuation of light. In FIG. 9, the abscissa axis indicates the distance (cm) from the light source, whereas the ordinate axis denotes the percentage (%) of the light intensity at each distance relative to the light intensity at a point where the distance from the light source is 50 cm.

For example, in a case where the light source is the light source 9 in the line of sight detection system 100, it is assumed that the distance to the subject person is 50 cm and an object, such as a wall, is located 50 cm behind the subject person. In this case, near-infrared light radiated from the light source 9 attenuates down to a value slightly above 20% at the position of the wall relative to the intensity when the near-infrared light reaches the subject person's face. Since the intensity of the light reaching the wall attenuates, the intensity of reflection light similarly attenuates.

Therefore, by setting a background region other than the subject person's face as the target region, the brightness of the environment can be estimated from a region assumed to be less affected by reflection. Accordingly, in a case where the relationship between the brightness information of the target region and the pupil size (radius) has already been learned, a pupil can be accurately detected even if the subject person is wearing glasses.

Figure 10A:
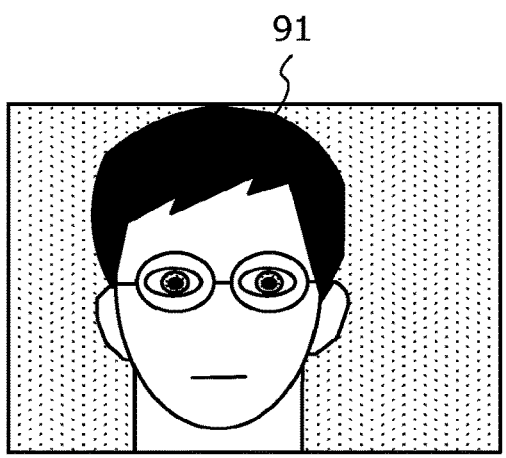
FIGS. 10A and 10B are diagrams for explaining a target region.
Figure 10B:
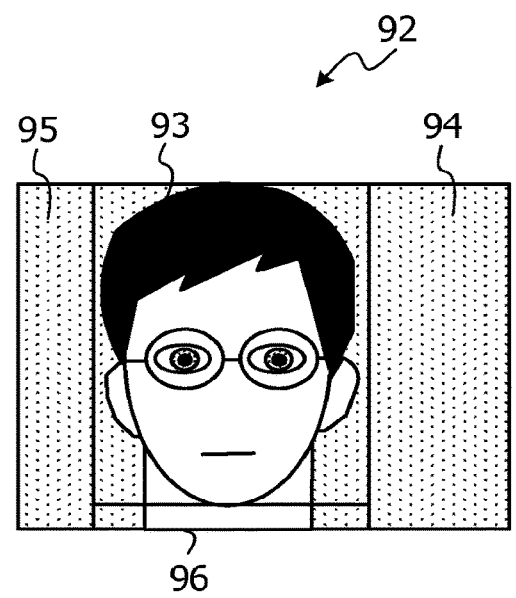

FIGS. 10A and 10B are diagrams for explaining the target region. FIG. 10A illustrates a captured near-infrared image 91 of the subject person's face. FIG. 10B illustrates a detected face region 93 and rectangular regions 94, 95, and 96 in a near-infrared image 92.

The target region may be an entire region including the combination of the rectangular regions 94, 95, and 96 but excluding the face region 93, or may be a partial region such as the rectangular region 94. The rectangular region 94 is located at the right side of the face region 93, the rectangular region 95 is located at the left side of the face region 93, and the rectangular region 96 is located at the lower side of the face region 93.

With regard to the target region, the accuracy of pupil detection increases as the percentage of a region that is less likely to be affected by the light radiated from the light source 9 increases. Therefore, similar to the face region 93, the rectangular region 96 that is closer in distance from the camera 8 and having a high possibility of including the torso section may be excluded from the target region.

Figure 11:
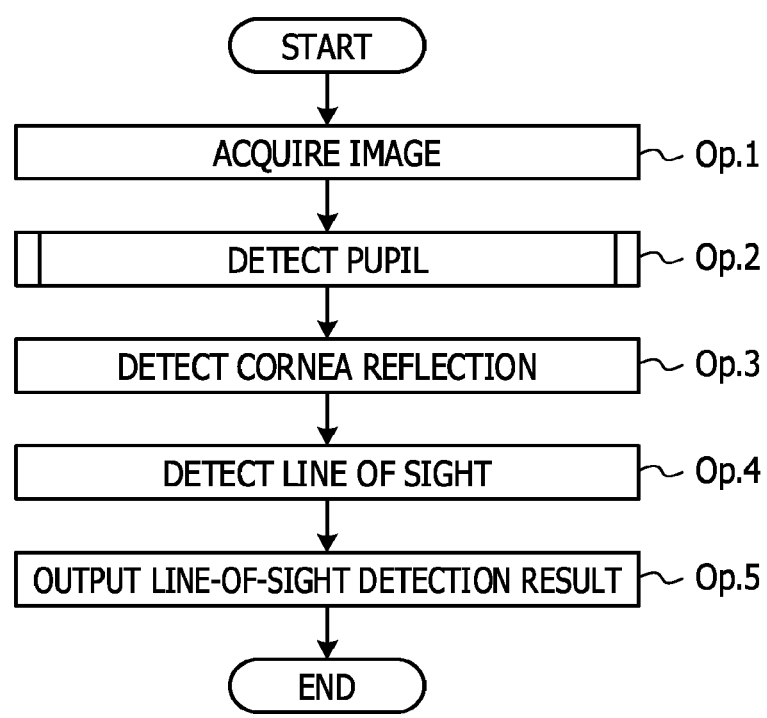
FIG. 11 is a flowchart of a line of sight detection process.

Next, the flow of the line of sight detection process according to this embodiment will be described. FIG. 11 is a flowchart of the line of sight detection process.

Figure 12:
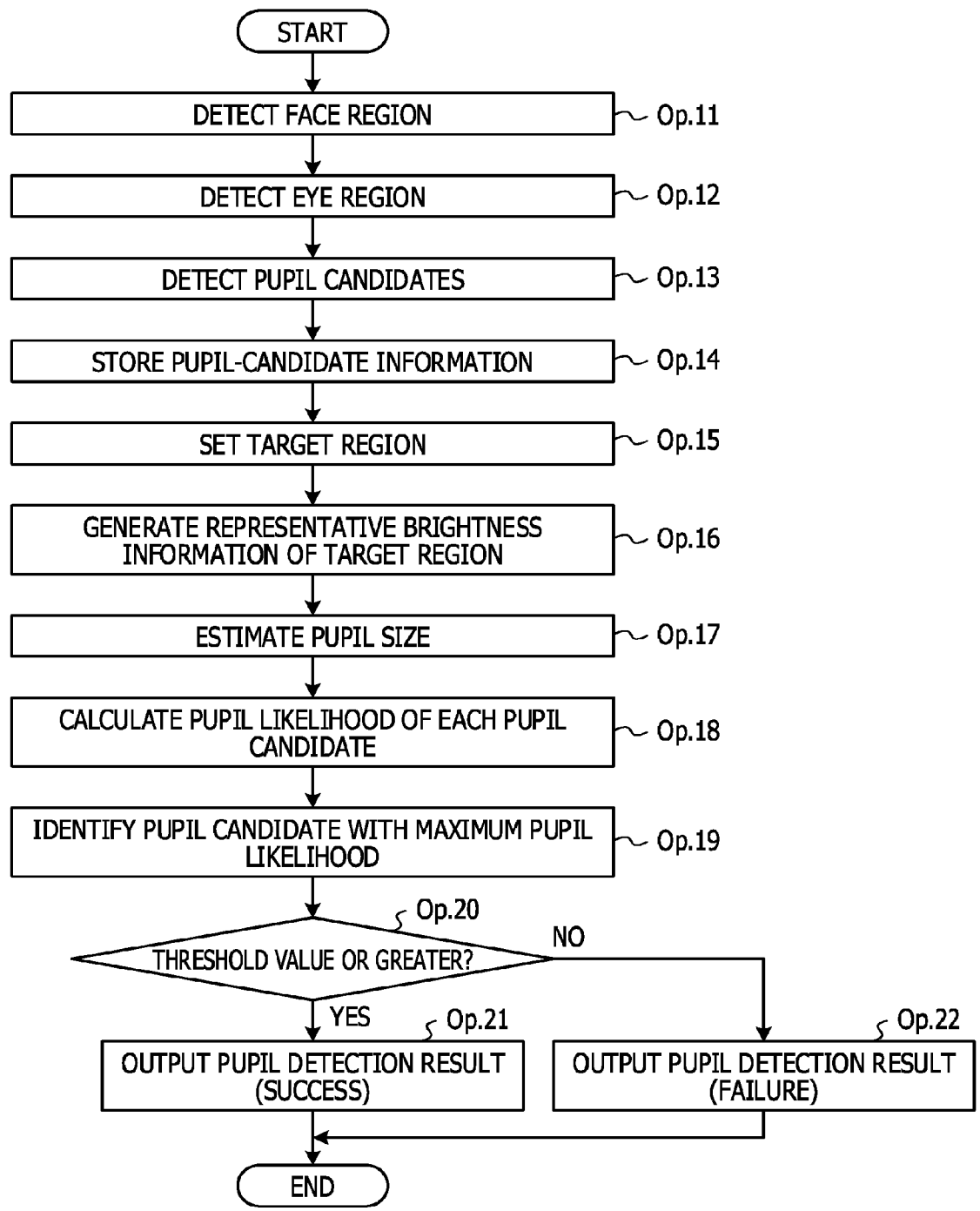
FIG. 12 is a flowchart of a pupil detection process.

First, the image acquisition unit 2 acquires image information of a near-infrared image captured by the camera 8 (Op. 1). Then, the pupil detection unit 3 detects a pupil by executing a pupil detection process (Op. 2). A flowchart of the pupil detection process is illustrated in FIG. 12.

Subsequently, the reflection detection unit 4 detects cornea reflection from the near-infrared image (Op. 3). The pupil detection process and the reflection detection process may be performed in the reverse order or may be performed concurrently. Then, the line of sight detection unit 5 detects a line of sight of a subject person based on the position of the pupil detected in accordance with the pupil detection process and the position of the cornea reflection detected in accordance with the reflection detection process (Op. 4). The output unit 6 then outputs information related to the detected line of sight to other devices (Op. 5).

Next, the pupil detection process will be described. FIG. 12 is a flowchart of the pupil detection process. First, the face detection unit 11 detects a face region of the subject person from the near-infrared image (Op. 11). Then, the pupil-candidate detection unit 12 detects an eye region from the near-infrared image (Op. 12). The pupil-candidate detection unit 12 acquires template information from the template storage unit 16 and detects pupil candidates by performing template matching (Op. 13).

Then, the pupil-candidate detection unit 12 generates pupil-candidate information with respect to the detected pupil candidates and stores the pupil-candidate information into the pupil-candidate storage unit 17 (Op. 14). Specifically, with respect to each of the plurality of pupil candidates, an ID is added thereto, and X and Y coordinates indicating the position of the pupil candidate, the size (radius) thereof, and a profile likelihood thereof are calculated. Then, for each pupil candidate, pupil-candidate information containing the ID, the X and Y coordinates, the size (radius), and the profile likelihood is stored into the pupil-candidate storage unit 17.

Subsequently, the estimating unit 13 sets a target region with respect to the near-infrared image (Op. 15). For example, a region other than the face region may be set as the target region, or a part of the region other than the face region may be set as the target region. However, a method for setting a target region when generating learning information and a method for setting a target region when performing pupil detection are preferably the same.

The estimating unit 13 then generates representative brightness information by using brightness information of the target region (Op. 16). For example, the estimating unit 13 calculates an average value of brightness values of pixels within the target region as the representative brightness information.

Subsequently, the estimating unit 13 estimates a pupil size based on learning information stored in the learning-information storage unit 18 and the representative brightness information (Op. 17). For example, if the learning information is a function, the estimating unit 13 inputs the representative brightness information to the function and acquires the output thereof as the pupil size.

Then, for each pupil candidate, the identifying unit 14 calculates a pupil likelihood indicating how certain the pupil candidate is a pupil in accordance with the above-described method (Op. 18). In detail, the identifying unit 14 calculates a size likelihood between the size of the pupil candidate and the estimated pupil size, and calculates the pupil likelihood based on the size likelihood and the profile likelihood.

After the identifying unit 14 calculates the pupil likelihood for each pupil candidate, the identifying unit 14 identifies a pupil candidate with the maximum pupil likelihood (Op. 19). Furthermore, the identifying unit 14 determines whether or not the pupil likelihood of the identified pupil candidate is greater than or equal to a preset threshold value (Op. 20).

If the pupil likelihood is greater than or equal to the threshold value (YES in Op. 20), the identifying unit 14 determines that the pupil candidate identified in Op. 19 is a pupil and outputs a pupil detection result (success) including information indicating the position of the pupil (Op. 21). The output destination is, for example, the line of sight detection unit 5.

If the pupil likelihood is smaller than the threshold value (NO in Op. 20), the identifying unit 14 determines that the pupil detection has failed and outputs a pupil detection result (failure) including information indicating that the pupil detection has failed (Op. 22). The output destination is, for example, the line of sight detection unit 5.

Figure 13A:
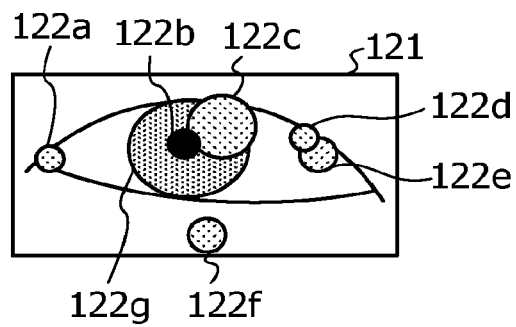
FIGS. 13A and 13B are diagrams for explaining a pupil detection result.
Figure 13B:
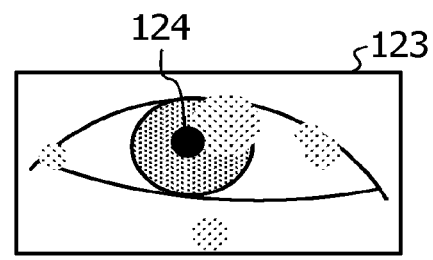

FIGS. 13A and 13B are diagrams for explaining a pupil detection result. FIG. 13A is an image diagram when pupil candidate detection is performed on an eye region 121. Specifically, a plurality of pupil candidates 122a to 122g are detected as pupil candidates.

FIG. 13B is an image diagram of a processing result (success) of the pupil detection process according to this embodiment. Specifically, one pupil candidate 122b is detected as a pupil 124 in an eye region 123. Accordingly, when pupil-candidate detection is performed, a plurality of pupil candidates are detected as a result of template matching. By evaluating each of the detected pupil candidates based on the pupil likelihood thereof in accordance with the brightness information of the target region, the most certain pupil candidate can be detected as a pupil.

By performing the series of pupil detection process in the above-described manner, the pupil size is estimated from the brightness information of the target region that is less likely to be affected by the reflection of near-infrared light, so that the accuracy of pupil detection can be maintained even if the subject person is wearing glasses. Therefore, the accuracy of the line of sight detection process using the result of the relevant pupil detection process can also be maintained.

Second Embodiment

A second embodiment is intended to properly estimate a pupil size in the following cases by determining which one of brightness information of a target region and brightness information of an eye region is to be suitably used.

Figure 14:
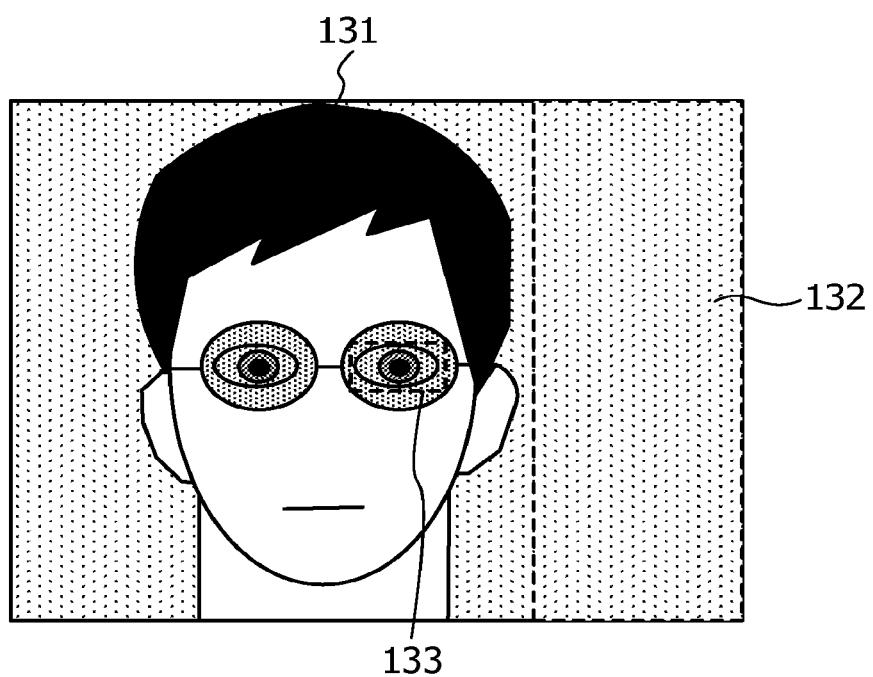
FIG. 14 is a diagram for explaining a second embodiment.

FIG. 14 is a diagram for explaining the second embodiment. In a near-infrared image 131 in FIG. 14, a target region 132 and an eye region 133 are set. A subject person in FIG. 14 is assumed to be wearing sunglasses instead of normal glasses. As a result of wearing sunglasses, a portion of visible light is blocked so that the pupils become smaller even in a bright environment. Specifically, when estimating a pupil size, the estimation accuracy of the pupil size is expected to be higher by using the brightness information of the eye region 133 rather than by using the brightness information of the target region 132.

In the second embodiment, the brightness information of the target region 132 and the brightness information of the eye region 133 are compared with each other so as to determine whether the pupil size is to be estimated by using the brightness information of the target region 132 (i.e., in a case where sunglasses are not worn) or the pupil size is to be estimated by using the brightness information of the eye region 133 (i.e., in a case where sunglasses are worn). In addition to a case where sunglasses are worn, an example of a scene where the second embodiment is effective may include a case where the eye region 133 is shaded.

Figure 15:
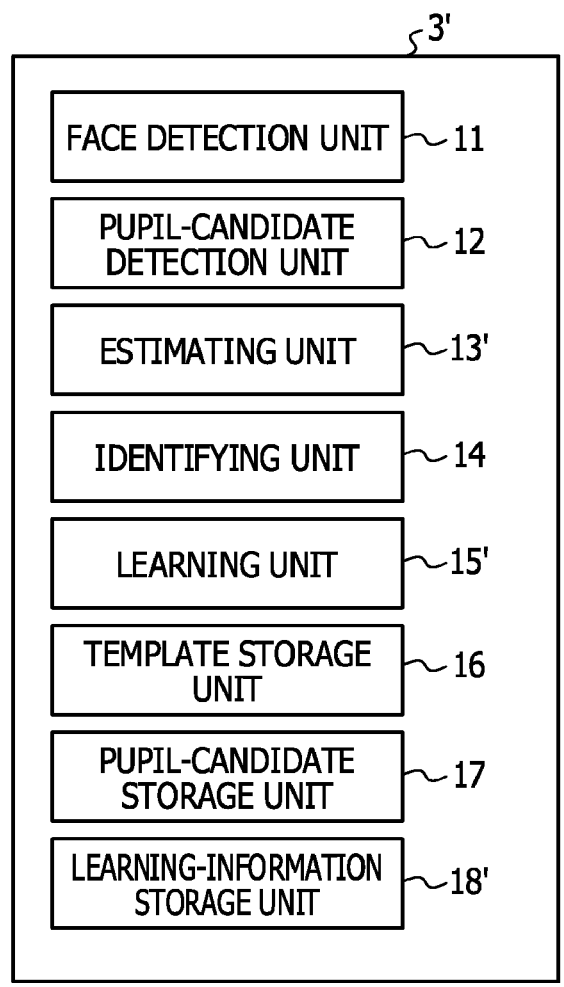
FIG. 15 illustrates a functional configuration example of a pupil detection unit according to the second embodiment.

The line of sight detection system 100 and the line of sight detection device 1 according to the second embodiment have functional configurations similar to those in the first embodiment but partly differ therefrom in terms of the process performed by the pupil detection unit 3 (pupil detection device) according to the first embodiment. FIG. 15 illustrates a functional configuration example of a pupil detection unit according to the second embodiment.

A pupil detection unit 3' has a face detection unit 11, a pupil-candidate detection unit 12, an estimating unit 13', an identifying unit 14, a learning unit 15', a template storage unit 16, a pupil-candidate storage unit 17, and a learning-information storage unit 18'. FIG. 15 also corresponds to a functional configuration example of a pupil detection device.

Processing units that perform processes similar to those in the first embodiment are given the same reference signs, and descriptions thereof are omitted. The hardware configuration of the pupil detection device corresponding to the pupil detection unit 3' or the hardware configuration of the line of sight detection device 1 including the pupil detection unit 3' is similar to that in the first embodiment.

The estimating unit 13' compares representative brightness information of a target region with representative brightness information of an eye region and estimates a pupil size based on the comparison result. For example, if the representative brightness information of the eye region is greater than the representative brightness information of the target region, the estimating unit 13' estimates the pupil size by using the representative brightness information of the target region and learning information (first learning information to be described later).

If the representative brightness information of the eye region is smaller than or equal to the representative brightness information of the target region, the estimating unit 13' estimates the pupil size by using the representative brightness information of the eye region and learning information (second learning information to be described later).

The learning unit 15' generates first learning information from a learning image captured in a state where light impinging onto an eye is not blocked, such as a state where the subject person is not wearing sunglasses, and generates second learning information from a learning image captured in a state where light impinging onto an eye is blocked, such as a state where the subject person is wearing sunglasses. The process for generating these pieces of learning information from the respective learning images is similar to that in the first embodiment.

The learning-information storage unit 18' stores the first learning information and the second learning information. Similar to the first embodiment, each of the first learning information and the second learning information expresses the relationship between brightness information and a pupil size and is, for example, function information.

Figure 16:
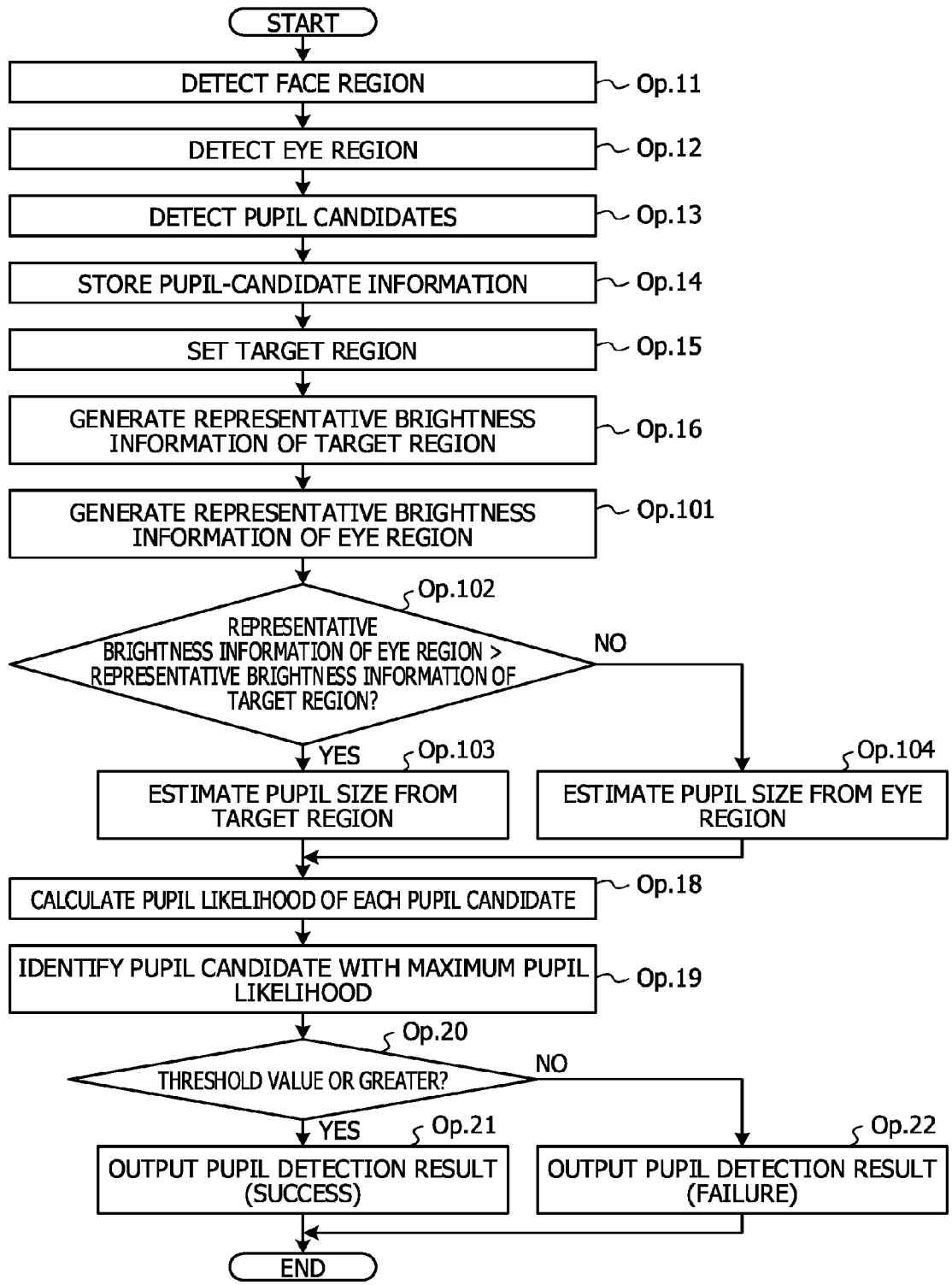
FIG. 16 is a flowchart of a pupil detection process according to the second embodiment.

The flow of a line of sight detection process according to the second embodiment is similar to that in the first embodiment (FIG. 11). However, the flow of a pupil detection process related to Op. 2 is different from that in the first embodiment. FIG. 16 is a flowchart of the pupil detection process according to the second embodiment. Steps similar to those in the pupil detection process according to the first embodiment are given the same reference signs, and descriptions thereof are omitted.

First, the face detection unit 11 detects a face region of the subject person from the near-infrared image (Op. 11). Then, the pupil-candidate detection unit 12 detects an eye region from the near-infrared image (Op. 12). Subsequently, the pupil-candidate detection unit 12 acquires template information from the template storage unit 16 and detects pupil candidates by performing template matching (Op. 13). Then, the pupil-candidate detection unit 12 generates pupil-candidate information with respect to the detected pupil candidates and stores the pupil-candidate information into the pupil-candidate storage unit 17 (Op. 14).

Subsequently, the estimating unit 13' sets a target region with respect to the near-infrared image (Op. 15). Then, the estimating unit 13' generates representative brightness information by using brightness information of the target region (Op. 16). For example, the estimating unit 13' calculates an average value of brightness values of pixels within the target region as the representative brightness information.

Subsequently, the estimating unit 13' generates representative brightness information of the eye region based on brightness information of a plurality of pixels included in the eye region detected in Op. 12 (Op. 101). Similar to the representative brightness information of the target region, the representative brightness information of the eye region is an average value or median value of the brightness values of the pixels within the target region.

Then, the estimating unit 13' compares the representative brightness information of the eye region with the representative brightness information of the target region (Op. 102). If the representative brightness information of the eye region is greater than the representative brightness information of the target region (YES in Op. 102), the estimating unit 13' estimates the pupil size based on the first learning information stored in the learning-information storage unit 18' and the representative brightness information of the target region (Op. 103). Specifically, similar to the first embodiment, the pupil size is estimated in accordance with the brightness information (i.e., the brightness of the surrounding area) of the target region.

If the representative brightness information of the eye region is smaller than or equal to the representative brightness information of the target region (NO in Op. 102), the estimating unit 13' estimates the pupil size based on the second learning information stored in the learning-information storage unit 18' and the representative brightness information of the eye region (Op. 104). Specifically, the pupil size is estimated in accordance with the brightness information of the eye region (i.e., the brightness of light impinging onto the eye).

Subsequently, for each pupil candidate, the identifying unit 14 calculates a pupil likelihood indicating how certain the pupil candidate is a pupil (Op. 18). After the identifying unit 14 calculates the pupil likelihood for each pupil candidate, the identifying unit 14 identifies a pupil candidate with the maximum pupil likelihood (Op. 19). Furthermore, the identifying unit 14 determines whether or not the pupil likelihood of the identified pupil candidate is greater than or equal to a preset threshold value (Op. 20).

If the pupil likelihood is greater than or equal to the threshold value (YES in Op. 20), the identifying unit 14 determines that the pupil candidate identified in Op. 19 is a pupil and outputs a pupil detection result (success) including information indicating the position of the pupil (Op. 21). If the pupil likelihood is smaller than the threshold value (NO in Op. 20), the identifying unit 14 determines that the pupil detection has failed and outputs a pupil detection result (failure) including information indicating that the pupil detection has failed (Op. 22).

Accordingly, in a case where the light impinging onto the eyes of the subject person is substantially blocked, the accuracy of pupil detection is expected to be higher by using the brightness information of the eye region rather than by using the brightness information of the target region. The pupil detection process according to the second embodiment can determine brightness information to be referred to (representative brightness information) and learning information to be referred to in accordance with a comparison result between the brightness information of the eye region and the brightness information of the target region.

First Modification

The pupil detection unit 3 or the pupil detection unit 3' may store a plurality of pieces of learning information for each of the sizes of eye regions and the positions of eye regions in an image. The pupil detection unit 3 or the pupil detection unit 3' may then estimate the positional relationship between the camera 8 and the subject person in accordance with the size of an eye region and the position of the eye region and estimate the pupil size by switching among the pieces of learning information to be used for the pupil detection in accordance with the positional relationship.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A detection method executed by a computer, the detection method comprising:
    detecting one or more pupil candidates from a face image region corresponding to a face of a subject in an image that includes a subject based on specific shape information;
    identifying an eye region in the image;
    comparing brightness information of the eye region with brightness information of a background portion of the image that excludes the face of the subject;
    identifying, when a result of the comparing indicates that a brightness of the eye region is brighter than a brightness of the background portion of the image that excludes the face of the subject, at least one pupil candidate as a pupil from among the one or more pupil candidates based on the brightness information of the background portion and based on relationship information indicating a relationship between the brightness information of the background portion and a size of the pupil; and
    identifying, when the result of the comparing indicates that the brightness of the eye region is darker than the brightness of the background portion, the at least one pupil candidate from the one or more pupil candidates based on another relationship information indicating a relationship between the brightness information of the eye region and the size of the pupil.

2. The detection method according to claim 1, further comprising:
    detecting learning pupils respectively from other face image regions in a plurality of learning images that are different from the image;
    generating the relationship information based on other brightness information related to other background portions of images that exclude the face of the subject and sizes of the learning pupils; and
    storing the relationship information into a memory.

3. The detection method according to claim 2, wherein the plurality of learning images are images captured in a photographic environment similar to a photographic environment for the image.

4. The detection method according to claim 1, wherein the image is a near-infrared image captured by a camera having sensitivity to near-infrared light.

5. The detection method according to claim 1, further comprising:
    identifying the size of the pupil corresponding to the brightness information by using the relationship information;
    determining a difference between the size and a size of each of the one or more pupil candidates; and
    identifying the at least one pupil candidate from the one or more pupil candidates based on the difference.

6. The detection method according to claim 5, further comprising:
    calculating a likelihood based on the specific shape information and a profile of each of the one or more pupil candidates; and
    identifying the at least one pupil candidate from the one or more pupil candidates based on the difference and the likelihood.

7. The detection method according to claim 1, further comprising:
    detecting cornea reflection of the subject from the image; and
    detecting a line of sight of the subject based on a positional relationship between the cornea reflection and the pupil.

8. A detection device, comprising:
    circuitry configured to:
        detect one or more pupil candidates from a face image region corresponding to a face of a subject in an image that includes a subject based on specific shape information;
        identify an eye region in the image;
        compare brightness information of the eye region with brightness information of a background portion of the image that excludes the face of the subject;
        identify, when a result of the comparing indicates that a brightness of the eye region is brighter than a brightness of the background portion of the image that excludes the face of the subject, at least one pupil candidate as a pupil from among the one or more pupil candidates based on the brightness information of the background portion and based on relationship information indicating a relationship between the brightness information of the background portion and a size of the pupil; and
        identify, when the result of the comparing indicates that the brightness of the eye region is darker than the brightness of the background portion, the at least one pupil candidate from the one or more pupil candidates based on another relationship information indicating a relationship between the brightness information of the eye region and the size of the pupil.

9. The detection device according to claim 8, wherein the circuitry is further configured to:
    detect learning pupils respectively from other face image regions in a plurality of learning images that are different from the image;
    generate the relationship information based on other brightness information related to other background portions of images that exclude the face of the subject and sizes of the learning pupils; and
    store the relationship information into a memory.

10. The detection device according to claim 9, wherein the plurality of learning images are images captured in a photographic environment similar to a photographic environment for the image.

11. The detection device according to claim 8, wherein the image is a near-infrared image captured by a camera having sensitivity to near-infrared light.

12. The detection device according to claim 8, wherein the circuitry is further configured to:
    identify the size of the pupil corresponding to the brightness information by using the relationship information;
    determine a difference between the size and a size of each of the one or more pupil candidates; and
    identify the at least one pupil candidate from the one or more pupil candidates based on the difference.

13. The detection device according to claim 12, wherein the circuitry is further configured to:
    calculate a likelihood based on the specific shape information and a profile of each of the one or more pupil candidates; and
    identify the at least one pupil candidate from the one or more pupil candidates based on the difference and the likelihood.

14. The detection device according to claim 8, further comprising:
    a light source configured to radiate light.

15. The detection device according to claim 14, further comprising:
    a camera configured to capture the image.

16. A non-transitory computer-readable storage medium storing a detection program for causing a computer to execute a process, the process comprising:
    detecting one or more pupil candidates from a face image region corresponding to a face of a subject in an image that includes a subject based on specific shape information;
    identifying an eye region in the image;
    comparing brightness information of the eye region with brightness information of a background portion of the image that excludes the face of the subject;
    identifying, when a result of the comparing indicates that a brightness of the eye region is brighter than a brightness of the background portion of the image that excludes the face of the subject, at least one pupil candidate as a pupil from among the one or more pupil candidates based on the brightness information of the background portion and based on relationship information indicating a relationship between the brightness information of the background portion and a size of the pupil; and
    identifying, when the result of the comparing indicates that the brightness of the eye region is darker than the brightness of the background portion, the at least one pupil candidate from the one or more pupil candidates based on another relationship information indicating a relationship between the brightness information of the eye region and the size of the pupil.

* * * * *